United States Patent
Jordan, Jr. et al.

(10) Patent No.: US 10,267,185 B2
(45) Date of Patent: Apr. 23, 2019

(54) SYSTEM AND METHOD FOR CONTROLLING COOLANT SUPPLY TO AN EXHAUST GAS

(71) Applicant: General Electric Company, Schenectady, NY (US)

(72) Inventors: Harold Lamar Jordan, Jr., Greenville, SC (US); Kevin Wood Wilkes, Greenville, SC (US); John Edward Sholes, King Mountain, NC (US); Yamil Miguel Morales Valvieja, Greenville, SC (US); John D Memmer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 762 days.

(21) Appl. No.: 14/814,422

(22) Filed: Jul. 30, 2015

(65) Prior Publication Data

US 2017/0030228 A1 Feb. 2, 2017

(51) Int. Cl.
*F02C 9/18* (2006.01)
*F01K 23/10* (2006.01)
(Continued)

(52) U.S. Cl.
CPC .......... *F01K 23/101* (2013.01); *F01D 25/305* (2013.01); *F01K 23/065* (2013.01);
(Continued)

(58) Field of Classification Search
CPC ...... F01D 25/305; F01K 23/10; F01K 23/101; F02C 6/08; F02C 6/18; F02C 7/141;
(Continued)

(56) References Cited

U.S. PATENT DOCUMENTS 5,044,152 A * 9/1991 Hoizumi ............... F01K 23/101
60/39.182
5,632,143 A * 5/1997 Fisher ..................... F01K 23/10
60/39.181
(Continued)

FOREIGN PATENT DOCUMENTS

EP 2 615 265 A2 7/2013

OTHER PUBLICATIONS

Combined Search and Examination Report issued in connection with corresponding GB Application No. 1612897.7 dated Jan. 11, 2017.

*Primary Examiner* — Gerald L Sung
*Assistant Examiner* — Marc Amar
(74) *Attorney, Agent, or Firm* — Fletcher Yoder P.C.

(57) ABSTRACT

A system may include an exhaust conduit configured to route an exhaust gas from an engine to a heat recovery steam generator (HRSG). The system may also include a coolant supply coupled to the exhaust conduit. The coolant supply is configured to supply a coolant to the exhaust conduit. Additionally, the system may include a controller configured to control the coolant supply to control an exhaust temperature of the exhaust gas flowing through the exhaust conduit from the engine to the HRSG, or a steam temperature of steam generated by the HRSG, or a combination thereof. The controller may be configured to control the coolant supply differently in a full load condition relative to a part load condition of the system.

19 Claims, 6 Drawing Sheets

(51) Int. Cl.
*F01D 25/30* (2006.01)
*F22B 1/18* (2006.01)
*F02C 6/18* (2006.01)
*F02C 7/141* (2006.01)
*F02C 7/18* (2006.01)
*F01K 23/06* (2006.01)

(52) U.S. Cl.
CPC ............... *F01K 23/10* (2013.01); *F02C 6/18* (2013.01); *F02C 7/141* (2013.01); *F02C 7/18* (2013.01); *F02C 9/18* (2013.01); *F22B 1/1815* (2013.01); *F05D 2220/72* (2013.01); *F05D 2270/303* (2013.01); *Y02E 20/16* (2013.01)

(58) Field of Classification Search
CPC ...... F02C 7/16; F02C 7/18; F02C 9/16; F02C 9/18; F22B 1/1815; Y02E 20/16; F05D 2220/72; F05D 2270/303
See application file for complete search history.

(56) References Cited

U.S. PATENT DOCUMENTS

| | | | | |
|---|---|---|---|---|
| 6,298,655 | B1 * | 10/2001 | Lee | F01D 25/30 60/39.182 |
| 6,523,346 | B1 * | 2/2003 | Hoffmann | F01K 23/10 60/646 |
| 7,742,904 | B2 * | 6/2010 | Healy | G05B 17/02 700/287 |
| 7,801,711 | B2 * | 9/2010 | Hayashi | F22B 35/18 700/288 |
| 7,814,906 | B2 | 10/2010 | Moretti | |
| 8,352,148 | B2 * | 1/2013 | D'Amato | G05B 13/048 60/646 |
| 8,510,013 | B2 | 8/2013 | Jordan, Jr. et al. | |
| 8,516,786 | B2 * | 8/2013 | Zhang | F01D 25/305 60/39.182 |
| 8,714,906 | B2 | 5/2014 | Morgan et al. | |
| 9,222,410 | B2 * | 12/2015 | Chillar | F02C 6/08 |
| 9,261,022 | B2 * | 2/2016 | Saha | F01D 17/141 |
| 9,366,194 | B2 * | 6/2016 | Feigl | F02C 9/18 |
| 9,644,498 | B2 * | 5/2017 | Hao | F01D 25/305 |
| 2009/0178417 | A1 * | 7/2009 | Draper | G01M 15/14 60/783 |
| 2009/0292436 | A1 * | 11/2009 | D'Amato | G05B 13/048 701/100 |
| 2011/0036066 | A1 * | 2/2011 | Zhang | F01D 25/305 60/39.5 |
| 2011/0147195 | A1 | 6/2011 | Shapiro et al. | |
| 2012/0058013 | A1 * | 3/2012 | Swanson | B01D 53/8625 422/109 |
| 2012/0159924 | A1 | 6/2012 | Tang et al. | |
| 2012/0186261 | A1 * | 7/2012 | Toprani | F01D 9/065 60/772 |
| 2012/0260667 | A1 * | 10/2012 | Chillar | F02C 6/08 60/779 |
| 2013/0152587 | A1 | 6/2013 | Jordan et al. | |
| 2013/0327053 | A1 | 12/2013 | Mitchell et al. | |
| 2014/0110092 | A1 | 4/2014 | John et al. | |
| 2014/0150438 | A1 * | 6/2014 | Ellis | F02C 9/26 60/772 |
| 2014/0157791 | A1 * | 6/2014 | Saha | F01D 17/141 60/785 |
| 2014/0162199 | A1 * | 6/2014 | Abrol | F23J 15/02 431/253 |
| 2014/0230444 | A1 * | 8/2014 | Hao | F01D 25/305 60/772 |
| 2015/0059355 | A1 * | 3/2015 | Feigl | F02C 9/18 60/782 |

\* cited by examiner

SYSTEM AND METHOD FOR CONTROLLING COOLANT SUPPLY TO AN EXHAUST GAS

BACKGROUND OF THE INVENTION

The subject matter disclosed herein relates to gas turbine systems, and more particularly, to heat recovery systems for gas turbine systems.

Combined cycle power plants combine engine systems with steam turbine systems to produce electricity while reducing energy waste. For example, certain combined cycle power plants include gas turbine systems that combust a fuel-air mixture to create torque that drives a load, such as an electrical generator. In order to reduce energy waste, exhaust gas from the gas turbine engine may be supplied to a heat recovery steam generator ("HRSG") to generate steam for a steam turbine. The power generated by the steam turbine may also drive an electrical generator or another type of load. As such, the combined cycle power plants may be useful in converting fuel and exhaust heat into power. It would be beneficial to improve the operations of a variety of combined cycle power plants.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosed subject matter. Indeed, the disclosed subject matter may encompass a variety of forms that may be similar to or different from the embodiments set forth below.

In a first embodiment, a system may include an exhaust conduit configured to route an exhaust gas from an engine to a heat recovery steam generator (HRSG). The system may also include a coolant supply coupled to the exhaust conduit. The coolant supply is configured to supply a coolant to the exhaust conduit. Additionally, the system may include a controller configured to control the coolant supply to control an exhaust temperature of the exhaust gas flowing through the exhaust conduit from the engine to the HRSG, or a steam temperature of steam generated by the HRSG, or a combination thereof. The controller may be configured to control the coolant supply differently in a full load condition relative to a part load condition of the system.

In a second embodiment, a system may include a controller configured to control a coolant supply to supply a coolant to an exhaust conduit that routes an exhaust gas from an engine to a heat recovery steam generator (HRSG). The controller may be configured to control the coolant supply to control an exhaust temperature of the exhaust gas flowing through the exhaust conduit from the engine to the HRSG, or a steam temperature of steam generated by the HRSG, or a combination thereof. Additionally, the controller may be configured to control the coolant supply differently in a full load condition relative to a part load condition of the system.

In a third embodiment, a method may include supplying, via a coolant supply, a coolant to an exhaust conduit that routes an exhaust gas from an engine to a heat recovery steam generator (HRSG). Additionally, the method may include controlling, via a controller, the coolant supply to control an exhaust temperature of the exhaust gas flowing through the exhaust conduit from the engine to the HRSG, or a steam temperature of steam generated by the HRSG, or a combination thereof. Controlling the coolant supply may include controlling the coolant supply differently in a full load condition relative to a part load condition.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION OF THE INVENTION

One or more specific embodiments of the disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the disclosed subject matter, the articles "a," "an," "the," and "said" are intended to mean that there are one or more of the elements. The terms "comprising," "including," and "having" are intended to be inclusive and mean that there may be additional elements other than the listed elements.

As discussed below, a power generation system, such as a combined cycle power plant, may reduce energy waste by supplying exhaust gas from an engine (e.g., a gas turbine engine and/or a reciprocating internal combustion engine) to an HRSG to generate steam for a steam turbine. The temperature of the exhaust gas may vary due to various conditions of a power generation system including the engine and the HSRG, such as the load conditions of the engine, the ambient conditions (e.g., ambient temperature, humidity, etc.), and so forth. For example, the temperature of the exhaust gas may increase during startup as the engine loads from a no-load or first load condition to a higher, second load condition. Additionally, the temperature of the exhaust gas may increase during turndown as the engine transitions from a full load condition (e.g., maximum output) or a third load state to a lower, part load condition (e.g., turndown condition) or a fourth load state. An increase in exhaust gas temperature may increase the temperature and pressure of steam produced by the HSRG. However, in some situations, the exhaust gas temperature may exceed boundary conditions or operating conditions of the HRSG, or the temperature and/or pressure of the steam generated by the HRSG may exceed the boundary conditions or operating conditions of a steam turbine that receives the steam. As such, the exhaust gas temperature, and thus the turndown load capability of the engine, may be limited based on the boundary conditions or operating conditions of the HSRG, the steam turbine, or both.

Accordingly, the present disclosure is generally related to systems and methods for controlling (e.g., via a processor-based controller) a coolant supply to an exhaust gas of an engine that is supplied to an HRSG. Specifically, the system (e.g., via the controller) controls a coolant supply to the exhaust gas to control a temperature of the exhaust gas, a temperature of a steam generated by the HRSG, or both. Additionally, the system (e.g., via the controller) may control the coolant supply differently in a full load condition of the system relative to a part load condition of the system. For example, the system (e.g., via the controller) may control the coolant supply different in a full load condition of the engine relative to a part load condition to adjust for variations in the exhaust gas temperature due to the load condition of the engine. By controlling the exhaust gas temperature, the steam temperature, or both, thus, the system (e.g., via the controller) may manage the balance of operating constraints of the system during varying load conditions. In particular, the system (e.g., via the controller) may independently manage the HSRG inlet temperature, the steam temperature, and the operation of the engine during varying load conditions, while maximizing the turndown capability of the system.

Figure 1:
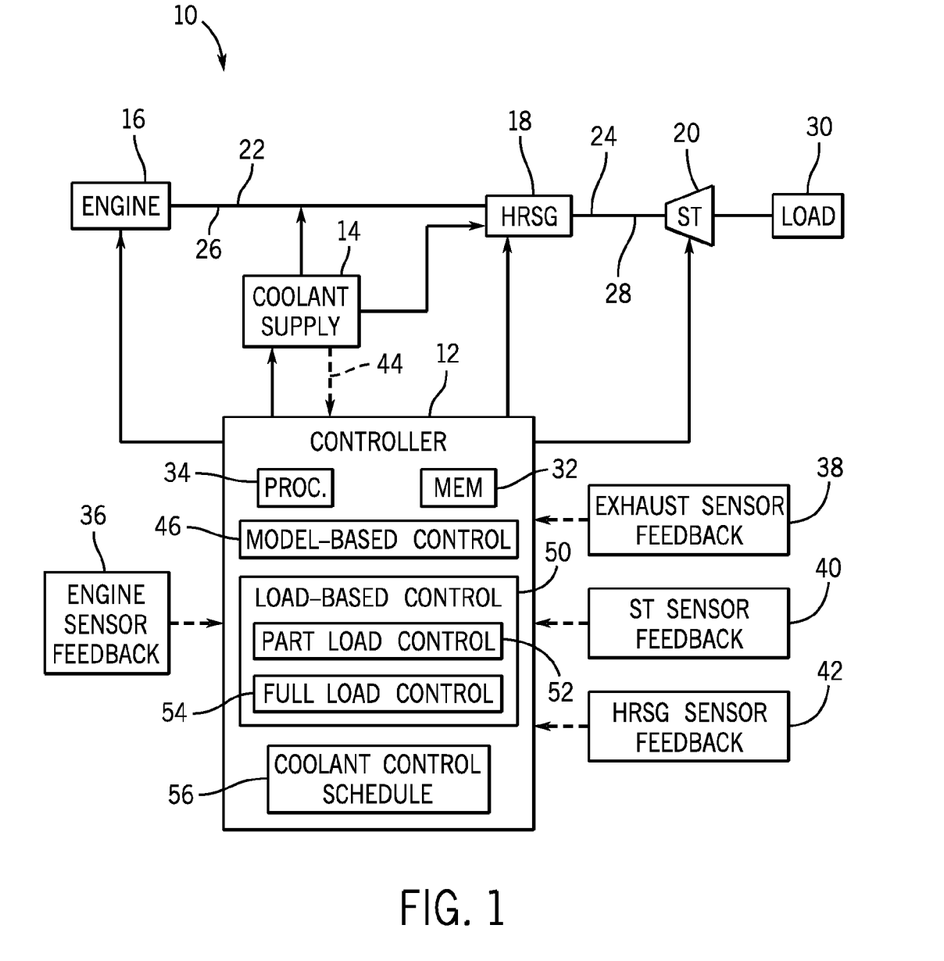
FIG. 1 is a block diagram of a combined cycle power plant including an engine, a heat recovery steam generator (HRSG), a steam turbine, a controller, and a coolant supply, in accordance with an embodiment of the present disclosure.

With the foregoing in mind, FIG. 1 is a block diagram of an embodiment of a system 10 with a controller 12 that controls (e.g., manages) a coolant supply 14 to enable the balance of operating conditions of the system 10 during varying load conditions of the system 10. In certain embodiments, the system 10 may be a combined cycle power plant. The system 10 includes the controller 12, the coolant supply 14, an engine 16, a heat recovery steam generator (HRSG) 18, and a steam turbine 20. In certain embodiments, the engine 16 may be a gas turbine engine, a reciprocating internal combustion engine, another heat engine or combustion system, or any other suitable engine. In operation, the engine 16 may combust a fuel-oxidant mixture, such as a fuel-air mixture, to create torque that drives a load, such as an electrical generator. In order to reduce energy waste, the system 10 may use the thermal energy in exhaust gas 22 from the engine 16 to heat a fluid and create steam 24 in the HRSG 18. The exhaust gas 22 may travel from the engine 16 to the HRSG 18 via an exhaust conduit 26, such as an exhaust duct or an exhaust diffuser. The steam 24 generated by the HRSG 18 may be supplied to the steam turbine 20 via a steam conduit 28. The steam turbine 20 may use the steam 24 to create torque that drives a load 30, such as an electrical generator. Accordingly, the system 10 may combine the engine 16 with the steam turbine 20 to increase power production while reducing energy waste (e.g., thermal energy in the exhaust gas 22).

As noted above, the controller 12 may control (e.g., manages) the supply of the coolant supply 14 (e.g., via control of valves, pumps, and/or other flow control units) to enable the balance of operating conditions of the system 10 during varying load conditions of the system 10, such as a full load condition or a part load condition. In particular, as will be described in more detail below, the controller 12 may control the coolant supply 14 to control a temperature and/or a flow rate of the exhaust gas 22, a temperature of the steam 24, or both during varying load conditions of the system 10. The coolant supply 14 may include any suitable liquid, gas, heat-exchanger, or a combination thereof. Further, the coolant supply 14 may be supplied to one or more locations along the exhaust conduit 26 that supplies the exhaust gas 22 from the engine 16 to the HRSG 18, to one or more locations into the HRSG 18, or both. That is, while the coolant supply 14 is supplied to one location along the exhaust conduit 26 and one location into the HRSG 18 in the illustrated embodiment, it should be appreciated that the coolant supply 14 may be supplied to any suitable location along the exhaust conduit 26 and/or into the HRSG 18, to any suitable number of locations along the exhaust conduit 26 and/or into the HRSG 18 (e.g., 2, 3, 4, 5, 6, 7, 8, 9, 10, or more). For example, in some embodiments, the coolant supply 14 may include a compressor configured to compress air that may be delivered to the exhaust conduit 26 and/or into the HRSG 18. In certain embodiments, the coolant supply 14 may include a blower or fan configured to blow air (e.g., ambient air) into the exhaust conduit 26 and/or into the HRSG 18. In some embodiments, the coolant supply 14 may include a water supply unit (e.g., a liquid supply, a water sprayer, a water mister, a vapor supply, etc.) configured to supply a water spray or a water mist to the exhaust conduit 26 and/or into the HRSG 18. Various embodiments of the coolant supply 14 will be described in more detail below with respect to FIG. 2.

In some embodiments, the controller 12 may control the coolant supply 14 to reduce the temperature of the exhaust gas 22, the temperature of the steam 24, or both during varying load conditions of the system 10. For example, the controller 12 may control the coolant supply 14 to reduce the temperature of the exhaust gas 22, the temperature of the steam 24, or both during startup and/or turndown of the system 10, startup and/or turndown of the engine 16, or both. As used herein, startup is a transition from a no-load condition to a second load condition. Additionally, as used herein, turndown is a transition from a full load (e.g., base load) or first load condition to a part load or second, lower load condition. As noted above, the temperature of the exhaust gas 22 may increase during startup and turndown of the engine 16 and may increase due to higher ambient temperatures, and in some situations, the temperature of the exhaust gas 22 may exceed boundary conditions or operating constraints of the HRSG 18 and/or may cause the temperature of the steam 24 to exceed boundary conditions or operating constraints of the steam turbine 20.

Accordingly, by controlling the coolant supply 14 to control the temperature of the exhaust gas 22, the temperature of the steam 24, or both, the controller 12 may balance the operating constraints of the engine 16, the HSRG 18, and the steam turbine 20 during varying load conditions. Additionally, the controller 12 may independently manage the inlet temperature of the HSRG 18, the temperature of the steam 24, and the operation of the engine 16 during varying load conditions, while maximizing the turndown capability of the system 10. In other words, the controller 12 may enable operation of both the HSRG 18 and the engine 16 at a load condition (e.g., during startup or turndown) that results in a temperature of the exhaust gas 22 that would otherwise (i.e., without the discussed embodiments) exceed the boundary conditions or operating constraints of the HSRG 18, while controlling the coolant supply 14 to reduce the temperature of the exhaust gas 22 to enable operation within the boundary conditions or operating constraints. Similarly, the controller 12 may enable operation of the HSRG 18, the steam turbine 20, and the engine 16 at a load condition (e.g., during startup or turndown) that results in a temperature of the steam 24 that would otherwise (i.e., without the discussed embodiments) exceed the boundary conditions or operating constraints of the steam turbine 20, while controlling the coolant supply 14 to reduce the temperature of the steam 24 to enable operation within the boundary conditions or operating constraints. Thus, the controller 12 may enable the system 10 to flexibly load the engine 16 while operating the HRSG 18 and the steam turbine 20 to increase combined loading (e.g., electrical output) of the engine 16 and the steam turbine 20, which may increase the efficiency of the system 10, saving time and money.

The controller 12 may include a memory 32 and a processor 34. The memory 32 may store instructions and steps written in software code. The processor 34 may access the memory 32 to read and execute the stored instructions based at least in part on feedback from the system 10. The controller 12 may control and communicate with various components in the system 10 in order to control the coolant supply 14 and to control the operation and loading of the engine 16, the HSRG 18, and/or the steam turbine 20. As illustrated, the controller 12 may control and/or communicate with the coolant supply 14, the engine 16, the HRSG 18, the steam turbine 20, and various components, such as electronics, valves, pumps, sensors, motors, actuators, etc. In particular, the controller 12 may control the coolant supply 14 based at least in part upon engine sensor feedback 36, exhaust sensor feedback 38, steam turbine sensor feedback 40, HRSG sensor feedback 42, and/or coolant supply sensor feedback 44 to control the temperature of the exhaust gas 22 and/or the temperature of the steam 24. It should be appreciated that the system 10 may include any suitable number and type of sensors disposed about (e.g., disposed in, disposed on, attached to, integrated with, etc.) the engine 16, the exhaust conduit 26, the HSRG 18, the steam conduit 28, steam turbine 20, and/or the coolant supply 14 to generate the engine sensor feedback 36, the exhaust sensor feedback 38, the steam turbine sensor feedback 40, the HRSG sensor feedback 42, and the coolant supply sensor feedback 44. For example, the system 10 may include one or more temperature sensors, flow rate sensors, pressure sensors, exhaust emission sensors (e.g., Nox, CO, $O_2$, unburnt fuel, particulate matter, etc.), vibration sensors, speed sensors, or any other suitable sensors.

In operation, the controller 12 may control temperature and/or flow rate of the coolant supply 14 based on a determined temperature and/or flow rate of the exhaust gas 22, a determined temperature of the steam 24, or both. Specifically, the controller 12 may control temperature and/or flow rate of the coolant supply 14 based on a determined temperature and/or flow rate of the exhaust gas 22 and/or a determined temperature of the steam 24 to control the temperature of the exhaust gas 22 relative to at least one exhaust gas temperature threshold and/or to control the temperature of the steam 24 relative to at least one steam temperature threshold. The at least one exhaust gas temperature threshold and the at least one steam temperature threshold may be stored in the memory 32. For example, the at least one exhaust gas temperature threshold may include a maximum exhaust gas temperature threshold, a minimum exhaust gas temperature threshold, or both. Similarly, the at least one steam temperature threshold may include a maximum steam temperature threshold, a minimum steam temperature threshold, or both. In certain embodiments, the memory 32 may be configured to store a plurality of exhaust gas temperature thresholds and steam temperature thresholds, which may be based at least in part on the type of HSRG 18, the type of steam turbine 20, the load condition of the system 10, the load condition of the engine 16, or any combination thereof, and the processor 34 may be configured to select one or more exhaust gas temperature thresholds and one or more steam temperature thresholds based on the type of the HSRG 18, the type of the steam turbine 20, the load condition of the system 10, and/or the load condition of the engine 16. For example, different types of HSRGs and steam turbines may have different boundary conditions or operating constraints, which may result in different exhaust gas temperature thresholds and steam temperature thresholds.

In certain embodiments, the controller 12 may be configured to determine the temperature and/or flow rate of the exhaust gas 22, the temperature of the steam 24, or both directly based on feedback from the system 10. In some embodiments, the exhaust sensor feedback 38 and/or the HRSG sensor feedback 42 may include a direct measurement of the temperature and flow rate of the exhaust gas 22. For example, the system 10 may include one or more sensors disposed about the exhaust conduit 26 and/or the inlet of the HSRG 18. Additionally, the HSRG sensor feedback 42 and/or the steam turbine sensor feedback 40 may include a direct measurement of the temperature of the steam 24. For example, the system 10 may include one or more sensors disposed about the outlet of the HSRG 18, the steam conduit 28, and/or the inlet of the steam turbine 20. Further, in some embodiments, controller 12 may be configured to directly determine the temperature and/or flow rate of the exhaust gas 22 after the coolant supply 14 is provided to the exhaust gas 22 based on the exhaust sensor feedback 38 and/or the HRSG sensor feedback 42. For example, the system 10 may include one or more sensors disposed about the exhaust conduit 26 (e.g., downstream from the introduction of the coolant supply 14) and/or the inlet of the HSRG 18 configured to provide a direct measurement of the temperature and/or flow rate of the exhaust gas 22 downstream of the coolant supply 14.

In other embodiments, the controller 12 may estimate the temperature and/or flow rate of the exhaust gas 22 downstream of the coolant supply 14. For example, the controller 12 may estimate the temperature and/or flow rate of the exhaust gas 22 downstream of the coolant supply 14 based on the exhaust sensor feedback 38 upstream of the coolant supply 14 and the coolant supply feedback 44. In particular, the exhaust sensor feedback 38 may provide a direct measurement of the temperature and/or flow rate of the exhaust gas 22 upstream of the coolant supply 14, and the coolant supply sensor feedback 44 may provide a direct measurement of the temperature and/or flow rate of the coolant supplied to the exhaust gas 22.

In some embodiments, the controller 12 may be configured to implement a model-based control 46 to derive, estimate, or predict one or more variables of the system 10. For example, the controller 12 may use the model-based control 46 to derive, estimate, or predict the temperature and/or flow rate of the exhaust gas 22 upstream of the coolant supply 14, the temperature and/or flow rate of the exhaust gas 22 downstream of the coolant supply 14, and/or the temperature of the steam 24. The model-based control 46 may include physics-based models, such as thermodynamic models, fluid models, computational fluid dynamics models, and the like. Additionally, the model-based control 46 may include statistical models, such as regression analysis models, data mining models (e.g., clustering models, classification models, association models), and the like. Regression analysis may be used to find functions capable of modeling future trends within a certain error range. Association techniques may be used to find relationships between variables. Further, the model-based control 46 may include artificial intelligence models, such as expert systems (e.g., forward chained expert systems, backward chained expert systems), neural networks, fuzzy logic systems, state vector machines, inductive reasoning machines, machine learning systems, Bayesian inference systems, and the like.

Additionally, in certain embodiments, the model-based control 46 may include Adaptive Real-time Engine Simulation (ARES) that may, in real-time, model one or more operating parameters of the engine 16. For example, the model-based control 46 may receive inputs of real-time operating parameters of the engine 16 via the engine sensor feedback 36, the exhaust sensor feedback 38, the coolant supply sensor feedback 44, and/or control effectors. The real-time inputs of operating parameters of the engine 16 may include, for example, ambient temperature, ambient pressure, specific humidity, fuel type (e.g., composition), fuel flow rate to engine, fuel temperature, emissions levels (e.g., CO, NO, $O_2$, unburnt fuel, particulate matter, etc.), vibration levels, inlet pressure loss, exhaust pressure loss, inlet bleed heat, compressor inlet temperature, shaft speed, load conditions of the system 10, load condition of the engine 16, coolant supply 14 temperature, coolant supply 14 flow rate, and/or any other suitable operating parameter.

The model-based control 46 may use the real-time inputs to derive, estimate, or predict one or more output parameters. For example, the output parameters may include flame or firing temperature, turbine power, compressor power, power output, compressor inlet conditions (e.g., temperature, pressure, flow), compressor conditions (e.g., temperature, pressure, flow) at one or more intermediate stages of the compressor, compressor discharge conditions (e.g., temperature, pressure, flow), compressor pressure ratio, compressor power, conditions of the exhaust gas 22 (e.g., temperature, pressure, flow) upstream of the coolant supply 14, conditions of the exhaust gas 22 (e.g., temperature, pressure, flow) downstream of the coolant supply 14, and/or any other suitable parameters. In some embodiments, the firing temperature, the compressor inlet conditions (e.g., temperature, pressure, flow), the compressor discharge conditions (e.g., temperature, pressure, flow), the compressor pressure ratio, the compressor power, and/or the conditions of the exhaust gas 22 (e.g., temperature, pressure, flow) upstream of the coolant supply 14 may be inlets for the model-based control 46 used to derive, estimate, or predict the conditions of the exhaust gas 22 (e.g., temperature pressure, flow) downstream of the coolant supply 14.

Further, in some embodiments, the model-based control 46 may implement ARES to model, in real-time, one or more operating parameters of the HRSG 18. For example, the model-based control 46 may receive inputs of real-time operating parameters of the HRSG 18 via the HSRG sensor feedback 42, the exhaust sensor feedback 38, the coolant supply sensor feedback 44, and/or control effectors. The real-time inputs of operating parameters of the HRSG 18 may include, for example, conditions of the exhaust gas 22 (e.g., temperature, pressure, flow) upstream of the coolant supply 14, conditions of the coolant supply 14 (e.g., temperature, pressure flow), conditions of the exhaust gas 22 (e.g., temperature, pressure, flow) downstream of the coolant supply 14, load conditions of the system 10, load condition of the engine 16, load condition of the HRSG 18, and/or inlet water conditions (e.g., temperature, pressure flow). The model-based control 46 may use the real-time inputs to derive, estimate, or predict one or more output parameters. For example, the output parameters may include conditions of the steam 24, such as temperature, pressure, and/or flow.

As noted above, the controller 12 may control the coolant supply 14 during varying load conditions of the system 10. Accordingly, in some embodiments, the controller 12 may be configured to implement load-based control 50, such as part load control 52 when the system 10 and/or the engine 16 are in a part load condition and full load control 54 when the system 10 and/or the engine 16 are in a full load condition. For example, the controller 12 may execute instructions to supply the coolant supply 14 or to adjust a temperature and/or flow rate of the coolant supply 14 when implementing the part load control 52. In certain embodiments, the controller 12 may supply the coolant supply 14 when the load of the engine 16 is between approximately 1 to 90 percent, 5 to 85 percent, 10 to 80 percent, 15 to 75 percent, 20 to 70 percent, or 25 to 65 percent of full load. In one embodiment, the controller 12 may supply the coolant supply 14 when the load of the engine 16 is between approximately 25 to 50 percent of full load.

In some embodiments, the controller 12 may decrease a temperature of the coolant supply 14 and/or increase a flow rate of the coolant supply 14 when implementing the part load control 52 relative to the full load control 54. That is, the controller 12 may control the coolant supply 14 to provide additional cooling during the part load control 52 relative to the full load control 54. In some embodiments, the controller 12 may not provide the coolant supply 14 when implementing the full load control 54. For example, the temperature of the exhaust gas 22 and the temperature of the steam 24 may generally be within acceptable limits (e.g., do not violate the at least one exhaust gas temperature threshold and the at least one steam temperature threshold, respectively) when the system 10 is operating at full load. It may be desirable to reduce the amount and/or duration of the coolant supply 14 supplied when the temperature of the exhaust gas 22 and the temperature of the steam 24 do not violate the at least one exhaust gas temperature threshold and the at least one steam temperature threshold, respectively, to reduce costs and increase efficiencies of the system 10. In other embodiments, the controller 12 may implement an open loop system during the full load control 54. For example, the controller 12 may execute instructions to provide the coolant supply 14 at a predetermined temperature and a predetermined flow rate without using feedback regarding the temperature of the exhaust gas 22 and/or the temperature of steam 24 during the full load control 54.

Additionally, in some embodiments, the controller 12 may be configured to implement a coolant control schedule 56 for controlling the coolant supply 14. For example, the controller 12 may schedule delivery of the coolant supply 14 when the temperature of the exhaust gas 22 and/or the temperature of the steam 24 approaches or reaches the at least one exhaust gas temperature threshold (e.g., a maximum exhaust gas temperature threshold) or the at least one steam temperature threshold (e.g., a maximum steam temperature threshold). In certain embodiments, the coolant control schedule 56 may be based at least in part on the load condition of the engine 16. In some embodiments, the controller 12 may implement a closed-loop control. For example, the controller 12 may use the engine sensor feedback 36, exhaust sensor feedback 38, steam turbine sensor feedback 40, HRSG sensor feedback 42, and/or coolant supply sensor feedback 44 to control the coolant supply 14 to set the temperature of the exhaust gas 22 and/or the temperature of the steam 24 at the at least one exhaust gas temperature threshold and the at least one steam temperature threshold, respectively. In some embodiments, for the closed loop control, the at least one exhaust gas temperature threshold and the at least one steam temperature threshold may each include a predetermined acceptable fluctuation range to reduce or minimize the frequency with which the coolant supply 14 is turned on and off by the controller 12. For example, the predetermined acceptable fluctuation range may allow a deviation of the temperature of the exhaust gas 22 or the temperature of the steam 24 that is greater than and/or less than the at least one steam temperature threshold, respectively, by approximately 0.25 degrees Celsius to 10 degrees Celsius, 0.5 degrees Celsius to 5 degrees Celsius, 0.75 degrees Celsius to 3 degrees Celsius, or 1 degree Celsius to 2 degrees Celsius.

In other embodiments, the controller 12 may be configured to implement an open loop control based on the coolant control schedule 56. In particular, the controller 12 may control the coolant supply 14 to control the temperature of the exhaust gas 22 and/or the temperature of the steam 24 without using feedback regarding the temperature of the exhaust gas 22 and/or the temperature of steam 24. In some embodiments, the controller 12 may implement the open loop control for various load conditions of the system 10, the engine 16, and/or the HRSG 18. For example, the controller 12 may implement the open loop control during startup of the system 10, the engine 16, and/or the HRSG 18. In some embodiments, the controller 12 may implement the open loop control during a full load condition of the system 10, the engine 16, and/or the HRSG 18. In certain embodiments, the controller 12 may implement a closed loop control and an open loop control based on the coolant control schedule 56, which may be based at least in part on the load conditions of the load conditions of the system 10, the engine 16, and/or the HRSG 18. For example, the controller 12 may implement the open loop control during startup, as noted above, and may implement the closed loop control during predetermined part load conditions. For example, the predetermined part load conditions may include a load of the engine 16 that is between approximately 5 to 85 percent, 10 to 80 percent, 15 to 75 percent, 20 to 70 percent, or 25 to 65 percent of full load. In one embodiment, predetermined part load conditions may include a load of the engine 16 that is between approximately 25 to 50 percent of full load.

Figure 2:
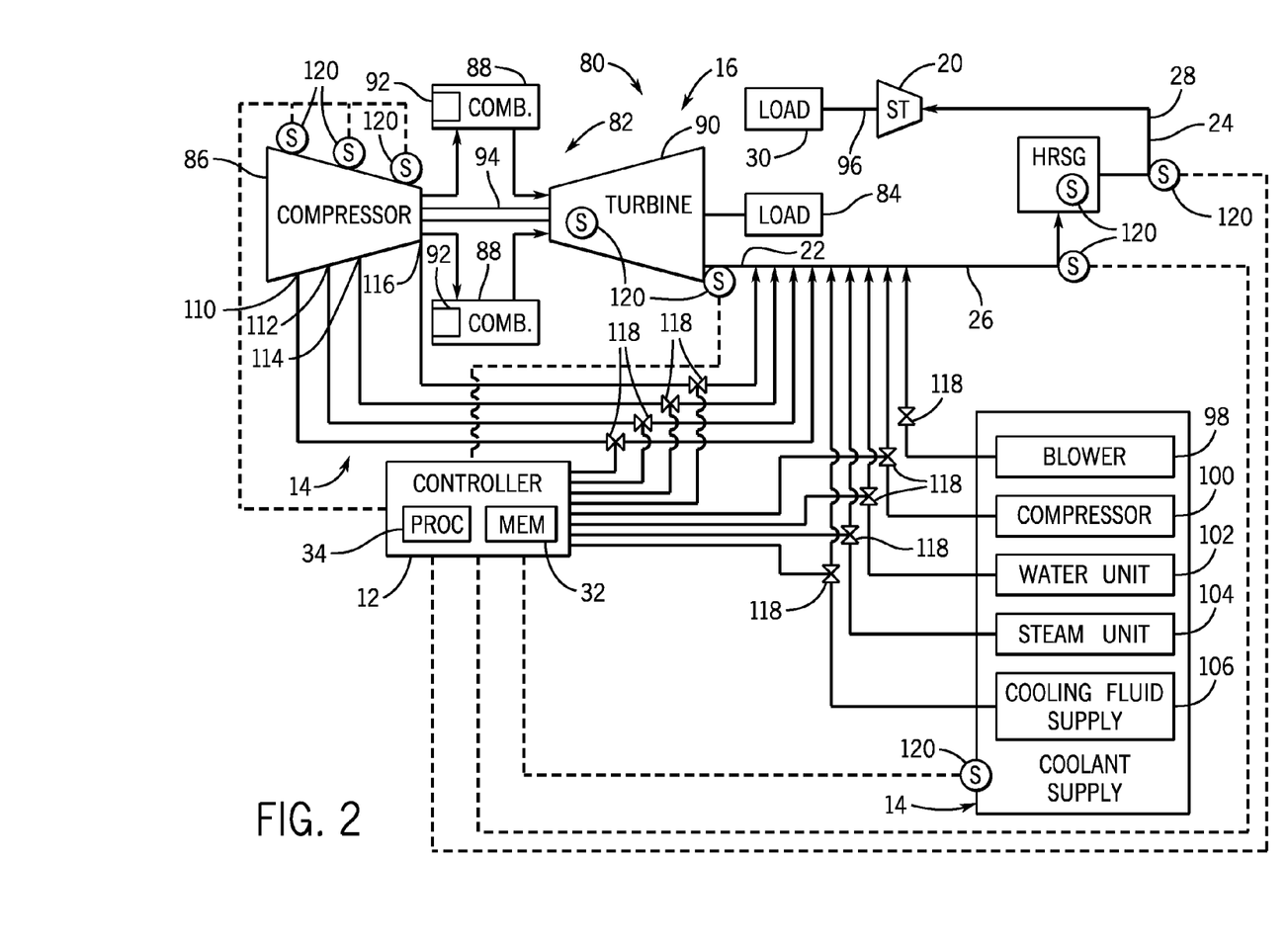
FIG. 2 is a block diagram of a combined cycle power plant including an gas turbine engine, an HRSG, a steam turbine, a controller, and a plurality of coolant supplies, in accordance with an embodiment of the present disclosure.

FIG. 2 is a block diagram of an embodiment of a combined cycle system 80 including a plurality of different types of the coolant supply 14. The system 80 may also include the controller 12, the engine 16, the HRSG 18, and the steam turbine 20 that drives the load 30. In the illustrated embodiment, the engine 16 includes a gas turbine system 82. In operation, the gas turbine system 82 may combust a fuel-oxidant mixture, such as a fuel-air mixture, to create torque that drives a load 84, such as an electrical generator. To reduce waste, the system 80 may use the thermal energy in the exhaust gas 22 from the gas turbine system 82 to heat a fluid and create steam 24 in the HRSG 18. Accordingly, the system 80 may combine the gas turbine system 82 with the steam turbine 20 to increase power production while reducing energy waste (e.g., thermal energy in the exhaust gas 22).

The gas turbine system 82 may include a compressor 86, a combustor 88, and a turbine 90. In operation, an oxidant (e.g., air, oxygen, oxygen enriched air, or oxygen reduced air) enters the compressor 86, and the compressor 86 pressurizes the oxidant in a series of compressor stages (e.g., rotor disks) with compressor blades. As the compressed oxidant exits the compressor 86, the oxidant enters the combustor 88 and mixes with fuel. The gas turbine system 82 may use liquid or gas fuel, such as natural gas and/or a hydrogen rich synthetic gas, to run the gas turbine system 82. For example, a plurality of fuel nozzles 92 may intake fuel, mix the fuel with the oxidant in a suitable ratio for combustion and inject the fuel-oxidant mixture into the combustor 88. The fuel-oxidant mixture combusts in a combustion chamber within combustor 88, thereby creating hot pressurized exhaust gas 22. The combustor 88 may direct the exhaust gas 22 through the turbine 90 toward the exhaust conduit 26 (e.g., an exhaust duct, an exhaust diffuser). As the exhaust gas 22 passes through the turbine 90, the exhaust gas 22 may contact turbine blades attached to turbine rotor disks (e.g., turbine stages) and may force the turbine blades to rotate the rotor disks. The rotation of the rotor disks may induce rotation of shaft 94 and the rotor disks in the compressor 86. Additionally, the load 84 connected to the shaft 94 may use the rotation energy of the shaft 94 to generate electricity.

Further, as noted above, the exhaust gas 22 may be supplied to the HRSG 18. The HRSG 18 may use the thermal energy in the exhaust gas 22 to convert water into the pressurized steam 24 and may supply the steam 24 to the steam turbine 20 via the steam conduit 28. As the steam 24 enters the steam turbine 20, the steam 24 may contact turbine blades attached to turbine rotor disks (e.g., turbine stages) and may induce the turbine blades to rotate the rotor disks. The rotation of the rotor disks may induce rotation of a shaft 96 of the steam turbine 20. As illustrated, the load 30 (e.g., electrical generator) connects to the shaft 96. Accordingly, the load 30 may use the rotation energy of the shaft 96 to generate electricity.

As noted above, the system 80 may include a plurality of different types of the coolant supply 14 that may each be controlled by the controller 12 to control a temperature and/or flow rate of the exhaust gas 22 and/or a temperature of the steam 24. As illustrated, the coolant supply 14 may include a fan or blower 98, an external compressor 100 (e.g., external to the gas turbine system 82), a water unit 102, a steam unit 104, and/or a cooling fluid supply 106. The blower 98 may blow or introduce ambient air or any other suitable gas within the exhaust conduit 26 and/or within the HRSG 18. In some embodiments, the blower 98 may be external to the gas turbine system 82. In other embodiments, the blower 98 may be an exhaust frame blower. The external compressor 100 may provide a compressed gas, such as compressed air, nitrogen, inert gas (e.g., nitrogen), $CO_2$, exhaust gas, or a combination thereof, at a lower temperature than the exhaust gas 22. Additionally, the water unit 102 may be configured to deliver a water spray and/or a water mist. For example, the water unit 102 may include one or more water spray systems or water mister systems. In certain embodiments, one or more water units 102 may be disposed within the exhaust conduit 26 and/or the HRSG 18. The steam unit 104 may provide a steam (e.g., a steam with a temperature less than the temperature of the exhaust gas 22 and/or less than the temperature of the steam 24). In certain embodiments, the steam unit 104 may receive excess or waste steam from a component of the system 80. The cooling fluid supply 106 may provide any suitable cooling fluid, such as, for example, water, air, inert gas (e.g., nitrogen), $CO_2$, exhaust gas, or a process fluid from a component of the system 80.

Additionally, the coolant supply 14 may include the compressor 86 of the gas turbine system 82. In particular, the coolant supply 14 may include over-board bleed air from the compressor 86. The over-board bleed air may be extracted from any suitable location of the compressor 86 and may be extracted from a plurality of different locations. For example, as illustrated, the over-board bleed air may be extracted from an initial stage 110, a first intermediate stage 112, a second intermediate stage 114, and/or a discharge stage 116 of the compressor 86. For example, in some embodiments, over-board bleed air may be extracted from the forward stages of the compressor 86 (e.g., the initial stage 110, the first intermediate stage 112, the second intermediate stage 114, etc.) for entraining ambient air to be used as the coolant supply 14. This may increase efficiency because the entrained ambient air would have more dilution capability for a given flow rate and less compressor air may be used to achieve the overall cooling effect. Additionally, lower pressure air may be used from the forward stages of the compressor 86 because less air may be used and may be less likely to cause a compressor stability concern. As will be appreciated, the location of the extraction of the over-board bleed air along the compressor 86 may affect the pressure and/or flow rate of the over-board bleed air (i.e., over-board bleed air from a higher stage of the compressor 86 may have a higher pressure than over-board bleed air from a lower or initial stage of the compressor 86). Accordingly, in embodiments including two or more extraction locations along the compressor 86 for the over-board bleed air, the controller 12 may be configured to select a suitable extraction location based on a desired pressure and/or flow rate of the over-board bleed air.

Further, as illustrated, the blower 98, the external compressor 100, the water unit 102, the steam unit 104, the cooling fluid supply 106, and the compressor 86 may each include at least one conduit for delivering the coolant to the exhaust conduit 26 (e.g., for direct injection into the exhaust conduit 26 for direct heat transfer with the exhaust gas 22). The system 80 may include any suitable number of conduits for delivering the coolant to the exhaust conduit 26, and the conduits may be shared by one or more of the blower 98, the external compressor 100, the water unit 102, the steam unit 104, the cooling fluid supply 106, and the compressor 86 or may be specific for one or more of the blower 98, the external compressor 100, the water unit 102, the steam unit 104, the cooling fluid supply 106, and the compressor 86. Further, the conduits for delivering the coolant may be disposed about any suitable location of the exhaust conduit 26. Additionally, the system 80 may include any suitable number of conduits for delivering the coolant to the HRSG 18, and the conduits may be shared by one or more of the blower 98, the external compressor 100, the water unit 102, the steam unit 104, the cooling fluid supply 106, and the compressor 86 or may be specific for one or more of the blower 98, the external compressor 100, the water unit 102, the steam unit 104, the cooling fluid supply 106, and the compressor 86. It should be noted that the controller 12 may be configured to utilize any suitable number and type of the coolant supply 14, and the controller 12 may be configured to select one or more of the plurality of different types of the coolant supply 14 for use based on one or more operating parameters of the system 80. Additionally, as illustrated, the system 80 may include one or more valves 118 along the one or more coolant-delivery conduits that may be controlled by the controller 12.

Further, the system 80 may include a plurality of sensors 120 configured to provide feedback relating to operating parameters of the system 80. The plurality of sensors 120 may include temperature sensors, pressure sensors, flow rate sensors, proximity sensors, flow sensors, exhaust emissions sensors (e.g., CO, NOx, $O_2$, unburnt fuel, particulate matter, or other composition sensors), and/or any other suitable sensors. The plurality of sensors 120 may be communicatively coupled to the controller 12 to provide the controller 12 with the feedback relating to the operating parameters of the system 10. In certain embodiments, one or more of the sensors 120 may include wireless sensors and/or wired sensors.

In particular, the plurality of sensors 120 may be configured to provide the engine sensor feedback 36 (e.g., feedback relating to the gas turbine system 82), the exhaust sensor feedback 38, the steam turbine sensor feedback 40, the HSRG sensor feedback 42, and the coolant supply sensor feedback 44. Accordingly, the system 80 may include one or more sensors disposed about the compressor 86 to provide the engine sensor feedback 36 and/or the coolant supply sensor feedback 44. Additionally, the system 80 may include one or more sensors 120 disposed about the different types of the coolant supply 14 (e.g., the blower 98, the external compressor 100, the water unit 102, the steam unit 104, and/or the cooling fluid supply unit 106) and/or about the coolant-delivery conduits to provide the coolant supply sensor feedback 44. Further, the system 80 may include one or more sensors 120 disposed about the exhaust conduit 26 to provide the exhaust sensor feedback 38 and/or the HRSG sensor feedback 42. For example, one or more sensors 120 may be disposed about the exhaust conduit 26 proximate to the turbine 90 to provide feedback relating to the temperature and/or flow rate of the exhaust gas 22 upstream of the introduction of the coolant supply 14, and one or more sensors 120 may be disposed about the exhaust conduit 26 proximate to the inlet of the HRSG 18 to provide feedback relating to the temperature and/or flow rate of the exhaust gas 22 downstream of the introduction of the coolant supply 14. Further, the system 80 may include one or more sensors 120 disposed about or in the HRSG 18 to provide the HRSG sensor feedback 42, and one or more sensors 120 disposed about or in the steam turbine 20 to provide the steam turbine sensor feedback 40. As noted above, the HSRG sensor feedback 42 and/or the steam turbine sensor feedback 40 may include a direct measurement of the temperature of the steam 24.

As described in detail above, the controller 12 may be configured to use the engine sensor feedback 36, the exhaust sensor feedback 38, the steam turbine sensor feedback 40, the HSRG sensor feedback 42, and/or the coolant supply sensor feedback 44 to control the coolant supply 14 to control the temperature and/or flow rate of the exhaust gas 22 and/or the temperature of the steam 24. In particular, as described above, the controller 12 may implement one or more control modes, such as the model-based control 46, the load-based control 50 (e.g., the part load control 52 and/or the full load control 54), and/or the coolant control schedule 56. In some embodiments, the controller 12 may utilize the feedback and/or the one or more control modes to select one or more of the different types of coolant supply 14 to use (e.g., the blower 98, the external compressor 100, the water unit 102, the steam unit 104, the cooling fluid supply 106, and the compressor 86), to control the timing or scheduling of the coolant provided by the one or more selected types of the coolant supply 14, and to control the amount and rate of coolant provided by the one or more selected types of coolant supply 14. For example, in certain embodiments, the controller 14 may use different coolant supplies 14 depending on operation conditions, such as different coolant supplies 14 for startup versus steady state, full load versus part load, etc.

Figure 3:
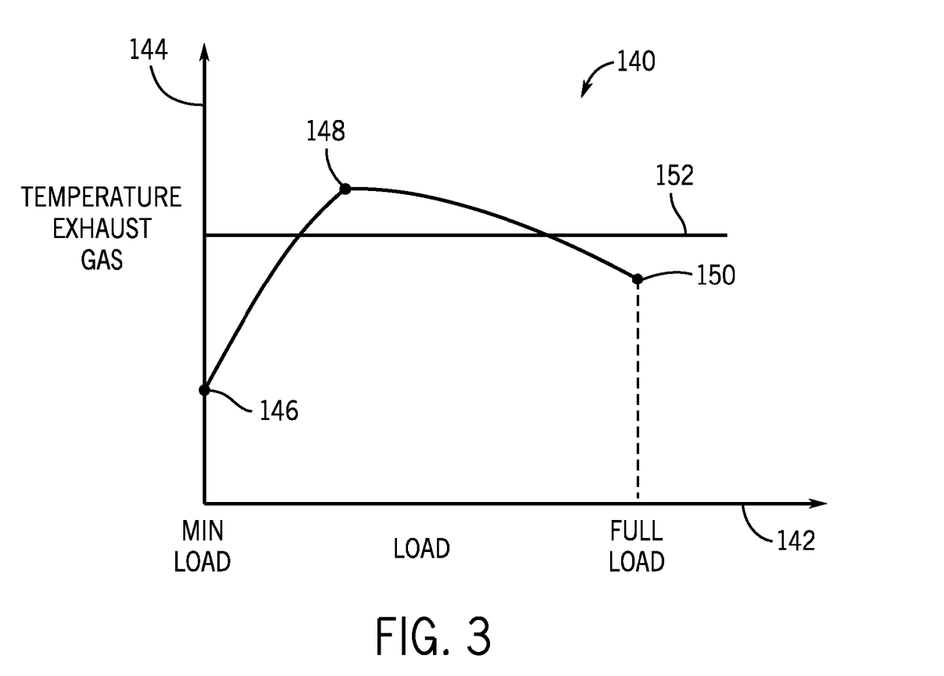
FIG. 3 is a graph of a temperature of an exhaust gas for different load conditions of a gas turbine engine.

FIG. 3 is a graph 140 illustrating the temperature of the exhaust gas 22 for different load conditions of the system 80. Specifically, the graph 140 illustrates the temperature of the exhaust gas 22 for different load conditions of the gas turbine system 82. As illustrated, the graph 140 includes an x-axis 142 representing loading of the gas turbine system 82, and a y-axis 144 representing the temperature of the exhaust gas 22. As the graph 140 illustrates, at a minimum load point 146, the gas turbine system 82 may operate and produce the exhaust gas 22 at a starting temperature. As the load increases, the temperature of the exhaust gas 22 may increase. In particular, as illustrated, the temperature of the exhaust gas 22 may peak at an intermediate load point 148. It should be appreciated that the peak temperature and the intermediate load point 148 are merely exemplary and may vary based on the operating parameters and boundary conditions of the gas turbine system 82, the operating parameters and boundary conditions of the system 80, and the ambient temperature. Further, it should be noted that the intermediate load point 148 may include a range of load conditions. Additionally, as illustrated, the temperature of the exhaust gas 22 may decrease between the intermediate load point 148 and a full load point 150 (e.g., a base load).

The graph 140 also illustrates a threshold temperature line 152. The threshold temperature line 152 may correspond to the at least one exhaust temperature threshold (e.g., a maximum exhaust temperature threshold) described in detail above. Accordingly, the controller 12 may be configured to control the coolant supply 14 to reduce the temperature of the exhaust gas 22, and optionally, to reduce the temperature of the steam 24, when the temperature of the exhaust gas 22 exceeds the threshold temperature line 152. In some embodiments, the controller 12 may execute instructions to stop the delivery of the coolant supply 14 when the temperature of the exhaust gas 22 is less than the threshold temperature line 152. While the threshold temperature line 152 is illustrated as a single line, it should be noted that in some embodiments, the threshold temperature line 152 may include the predetermined acceptable fluctuation range (e.g., upper and lower thresholds), as described above, to reduce or minimize the frequency with which the coolant supply 14 is turned on and off by the controller 12.

FIGS. 4-7 illustrate methods for controlling the coolant supply 14. The methods described in FIGS. 4-7 may be computer-implemented methods. In particular, one or more steps or all steps of the methods of FIGS. 4-7 may be executed using the controller 12. For example, the processor 54 of the controller 12 may execute instructions stored in the memory 52 of the controller 12 to perform one or more steps of the methods of FIGS. 4-7. In some embodiments, the controller 12 may be configured to implement the model-based control 46, the load-based control 50 (e.g., the part load control 52 and/or the full load control 54), and/or the coolant control schedule 56 to perform one or more steps or all steps of the methods of FIGS. 4-7.

Figure 4:
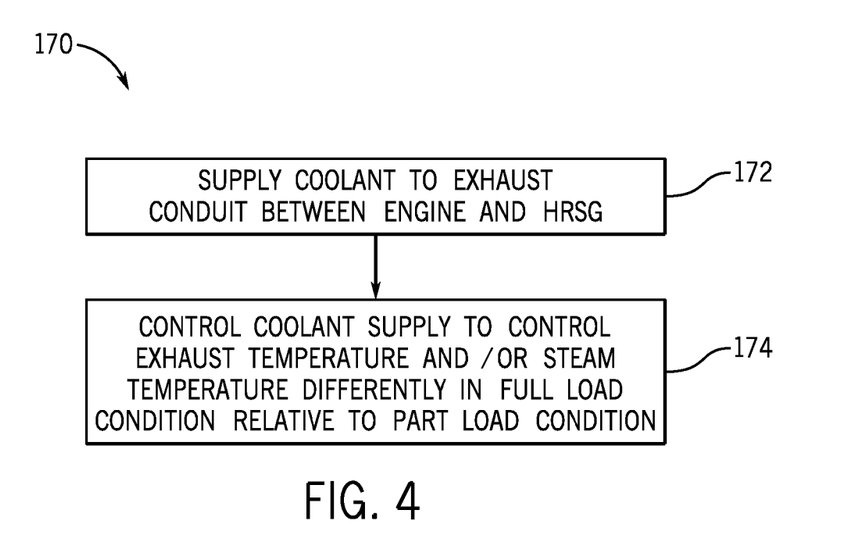
FIG. 4 is a flow diagram of a method for controlling a coolant supply to control an exhaust gas temperature and/or a steam temperature differently in a full load condition relative to a part load condition, in accordance with an embodiment of the present disclosure.

FIG. 4 is flow chart of an embodiment of a computer-implemented method 170 for controlling the coolant supply 14 to control a temperature of the exhaust gas 22 and/or a temperature of the steam 24 differently in a full load condition relative to a part load condition. For example, the method 170 may include supplying (block 172) coolant (e.g., the coolant supply 14) to the exhaust conduit 26 between an engine (e.g., the engine 16 or the turbine 90) and the HRSG 18. The coolant may be supplied from any of the different types of the coolant supply 14 described above, such as the compressor 86 of the gas turbine system 82, the blower 98, the external compressor 100, the water unit 102, the steam unit 104, the cooling fluid supply 106, or any combination thereof.

The method 170 may also include controlling (block 174) the coolant supply 14 to control the temperature of the exhaust gas 22 and/or the temperature of the steam 24 differently in a full load condition relative to a part load condition. As noted above, the full load and part load conditions may be conditions of the engine 16, the gas turbine system 82, the HRSG 18, the steam turbine 20, the system 10, and/or the system 80. As described in detail above, in some embodiments, the controller 12 may execute instructions to supply coolant from the coolant supply 14 during one or more part load conditions (e.g., between approximately 25 to 50 percent of the full load) and to stop the supply of coolant from the coolant supply 14 during the full load condition. Further, as described above, the controller 12 may control the supply of coolant from the coolant supply 14 (e.g., via valves, actuators, etc.) during the part load condition based at least in part on one or more inputs, such as the engine sensor feedback 36, the exhaust sensor feedback 38, the steam turbine sensor feedback 40, the HRSG sensor feedback 42, and/or the coolant sensor feedback 44.

Figure 5:
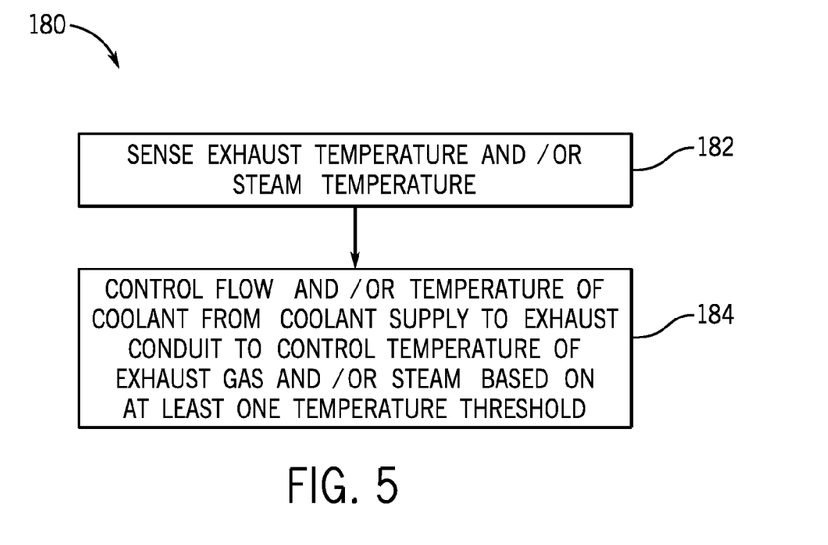
FIG. 5 is a flow diagram of a method for controlling a coolant supply to control an exhaust gas temperature and/or a steam temperature based on at least one temperature threshold, in accordance with an embodiment of the present disclosure.

FIG. 5 is a flow chart of an embodiment of a computer-implemented method 180 for controlling the coolant supply 14 to control a temperature of the exhaust gas 22 and/or a temperature of the steam 24 based on at least one temperature threshold. The method 180 may include sensing (block 182) the temperature of the exhaust gas 22 and/or the temperature of the steam 24. For example, the controller 12 may receive input or feedback relating to the temperatures of the exhaust gas 22 and/or the steam 24, such as the exhaust sensor feedback 38, the sensor turbine sensor feedback 40, and/or the HRSG sensor feedback 42, from one or more of the sensors 120. As noted above, in some embodiments, one or more of the sensors 120 may provide direct measurements of the temperature of the exhaust gas 22 and the steam 24.

The method 180 may also include controlling (block 184) the flow and/or temperature of coolant from the coolant supply 14 to the exhaust conduit 26 to control the temperature of the exhaust gas 22 and/or the temperature of the steam 24 based on at least one temperature threshold. For example, the controller 12 may compare the sensed temperatures of the exhaust gas 22 and the steam 24 to the at least one exhaust gas temperature threshold and the at least one steam temperature threshold, respectively. Further, the controller 12 may execute instructions to provide coolant from the coolant supply 14 or to adjust a temperature and/or flow rate of the coolant from the coolant supply 14 based at least in part upon a determination that the sensed temperature of the exhaust gas 22 and/or the sensed temperature of the steam 24 violates (e.g., exceeds) or does not comply with the at least one exhaust gas temperature threshold and the at least one steam temperature threshold, respectively. In particular, the controller 12 may execute instructions to provide the coolant from the coolant supply 14 or to adjust a temperature and/or flow rate of the coolant from the coolant supply 14 (e.g., via valves, actuators, etc.) to reduce the temperature of the exhaust gas 22 and/or the temperature of the steam 24 based on the determination.

Figure 6:
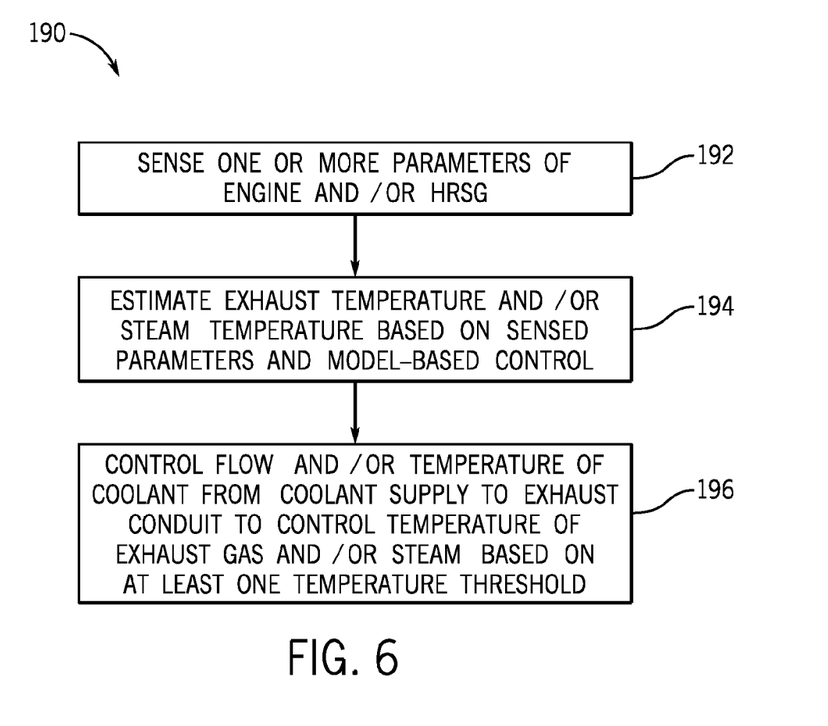
FIG. 6 is a flow diagram of a method for controlling a coolant supply to control an exhaust gas temperature and/or a steam temperature based on a model-based control and at least one temperature threshold, in accordance with an embodiment of the present disclosure.

FIG. 6 is a flow chart of an embodiment of a computer-implemented method 190 for controlling the coolant supply 14 to control a temperature of the exhaust gas 22 and/or a temperature of the steam 24 based on the model-based control 46 and at least one temperature threshold. The method 190 may include sensing (block 192) one or more parameters of an engine (e.g., the engine 16, the gas turbine system 82) and/or one or more parameters of the HRSG 18. For example, the controller 12 may receive the engine sensor feedback 36 and/or the HRSG sensor feedback 42, from one or more of the sensors 120. The method 190 may also include estimating (block 194) the temperature of the exhaust gas 22 and/or the temperature of the steam 24 based on the sensed parameters and the model-based control 46. For example, as described above, the controller 12 may be configured to use at least one or more operating parameters from the engine sensor feedback 36 and/or the HRSG sensor feedback 42 as inputs for the model-based control 46 and may use the model-based control 46 to output (e.g., estimate, derive, predict) the temperature of the exhaust gas 22 and/or the temperature of the steam 24.

Additionally, the method 190 may include controlling (block 196) the flow and/or temperature of coolant from the coolant supply 14 to the exhaust conduit 26 to control the temperature of the exhaust gas 22 and/or the temperature of the steam 24 based on at least one temperature threshold. For example, the controller 12 may compare the estimated temperatures of the exhaust gas 22 and the steam 24 to the at least one exhaust gas temperature threshold and the at least one steam temperature threshold, respectively. Further, the controller 12 may execute instructions to provide the coolant from the coolant supply 14 or to adjust a temperature and/or flow rate of the coolant from the coolant supply 14 based at least in part upon a determination that the estimated temperature of the exhaust gas 22 and/or the estimated temperature of the steam 24 violates (e.g., exceeds) or does not comply with the at least one exhaust gas temperature threshold and the at least one steam temperature threshold, respectively. In particular, the controller 12 may execute instructions to provide the coolant supply 14 or to adjust a temperature and/or flow rate of the coolant from the coolant supply 14 (e.g., via valves, actuators, etc.) to reduce the temperature of the exhaust gas 22 and/or the temperature of the steam 24 based on the determination.

Figure 7:
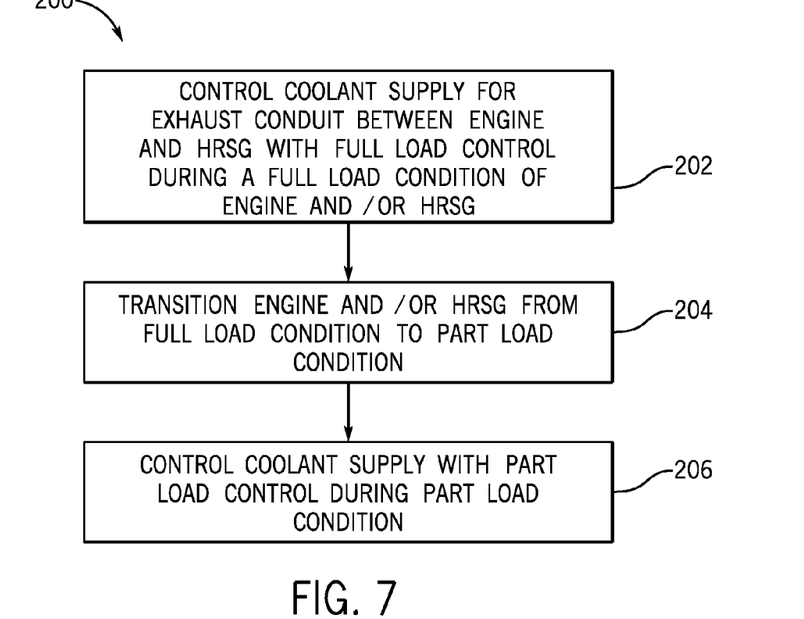
FIG. 7 is a flow diagram of a method for controlling a coolant supply using a full load control and a part load control, in accordance with an embodiment of the present disclosure.

FIG. 7 is a flow chart of an embodiment of a computer-implemented method 200 for controlling the coolant supply 14 using a full load control and a part load control. The method 200 may include controlling (block 202) the coolant supply 14 (e.g., via valves, actuators, pumps, motors, compressors, etc.) for the exhaust conduit 26 between an engine (e.g., the engine 16, the turbine 90) and the HRSG 18 with the full load control 54 during a full load condition of the engine and/or the HRSG 18. In certain embodiments, the coolant supply 14 may not be provided to the exhaust conduit 26 during the full load control 56. For example, the controller 12 may execute instructions to stop or prevent the supply of coolant from the coolant supply 14. In some embodiments, the instructions for implementing the full load control 56 may not include instructions for supplying coolant from the coolant supply 14. In other embodiments, the full load control 56 may include an open loop system for controlling coolant from the coolant supply 14 without using feedback relating to the temperature of the exhaust gas 22 and/or the steam 24. In certain embodiments, the full load control 56 may include a closed loop system for controlling coolant from the coolant supply 14 based on feedback relating to the temperature of the exhaust gas 22 and/or the steam 24.

The method 200 may also include transitioning (block 204) the engine and/or the HRSG 18 from the full load condition to a part load condition. In particular, the transition may include reducing the load of the engine and/or the HRSG 18. Additionally, the method 200 may include controlling (block 206) the coolant supply 14 with the part load control 54 during the part load condition. For example, in some embodiments, the part load control 54 may include decreasing a temperature and/or increasing a flow rate of the coolant from the coolant supply 14 relative to the full load control 56. In other embodiments, the part load control 54 may include initializing a supply of coolant from the coolant supply 14. Additionally, in some embodiments, the part load control 54 may include supplying coolant from the coolant supply 14 using a closed loop control system based on feedback relating to the temperature of the exhaust gas 22 and/or the steam 24.

Figure 8:
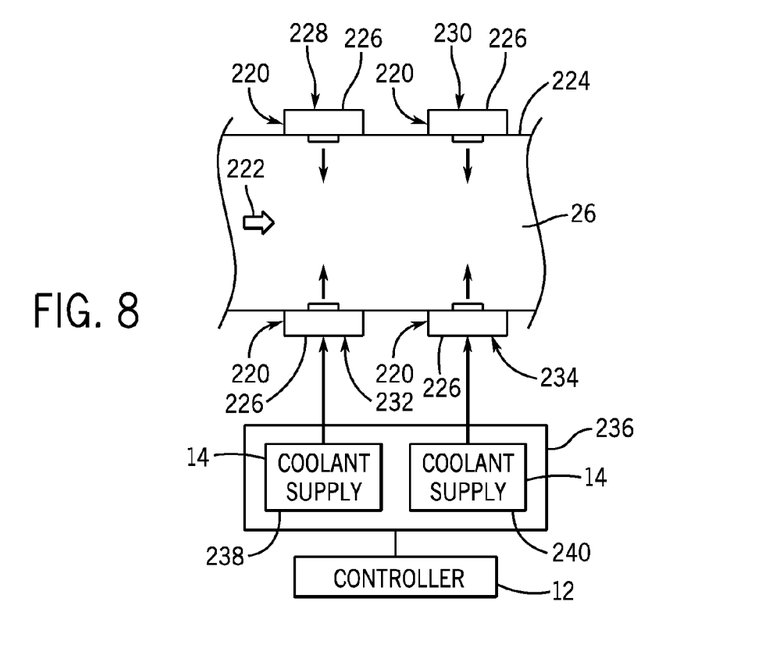
FIG. 8 is a partial radial cross-sectional view of an exhaust conduit including a plurality of injection sites configured to receive a coolant supply, in accordance with an embodiment of the present disclosure.

FIG. 8 is a partial radial cross-sectional view of the exhaust conduit 26 including a plurality of injection sites 220 (e.g., injectors, injection manifolds, or both) configured to receive coolant from the coolant supply 14. As illustrated, the exhaust gas 22 flows through the exhaust conduit 26 as generally indicated by arrow 222. The exhaust conduit 26 may include an outer wall 224, which may be annular, conical, rectangular, or any other suitable geometry. The injection sites 220 may each include at least an opening (e.g., injection port or nozzle) through the outer wall 224 for routing coolant from the coolant supply 14 to the exhaust conduit 26. Further, the injection sites 220 may include manifold piping 226 configured to receive the coolant from the coolant supply 14 and to route the coolant from the coolant supply 14 to the injection sites 220. However, it should be appreciated that the injection sites 220 may also include conduits, valves, or any other suitable components for receiving and routing the coolant from the coolant supply 14. The injection sites 220 may be disposed about the outer wall 224 in any suitable location. For example, the injection sites 220 may be located about the same or different axial and circumferential positions of the exhaust conduit 26. As illustrated, the exhaust conduit 26 may include a first injection site 228 at a first axial position and a first circumferential position, a second injection site 230 at the first axial position and a second circumferential position, a third injection site 232 at a second axial position and the first circumferential position, and a fourth injection site 234 at the second axial position and the second circumferential position. It should be noted that any suitable number of injection sites 220 may be used. For example, the exhaust conduit 26 may include 1, 2, 3, 4, 5, 6, 7, 8, 9, 10, or more injection sites 220.

Additionally, the coolant supply 14 may include a manifold 236 configured to provide coolant from the coolant supply 14 to the exhaust conduit 26. In some embodiments, the manifold 236 may be configured to provide coolant from different types of the coolant supply 14, such as the compressor 86, the blower 98, the external compressor 100, the water unit 102, the steam unit 104, and/or the cooling fluid supply 106, to the exhaust conduit 26. For example, as illustrated, the manifold 236 may be configured to provide coolant from a first coolant supply 238 of a first type and coolant from a second coolant supply 240 of a second type.

Figure 9:
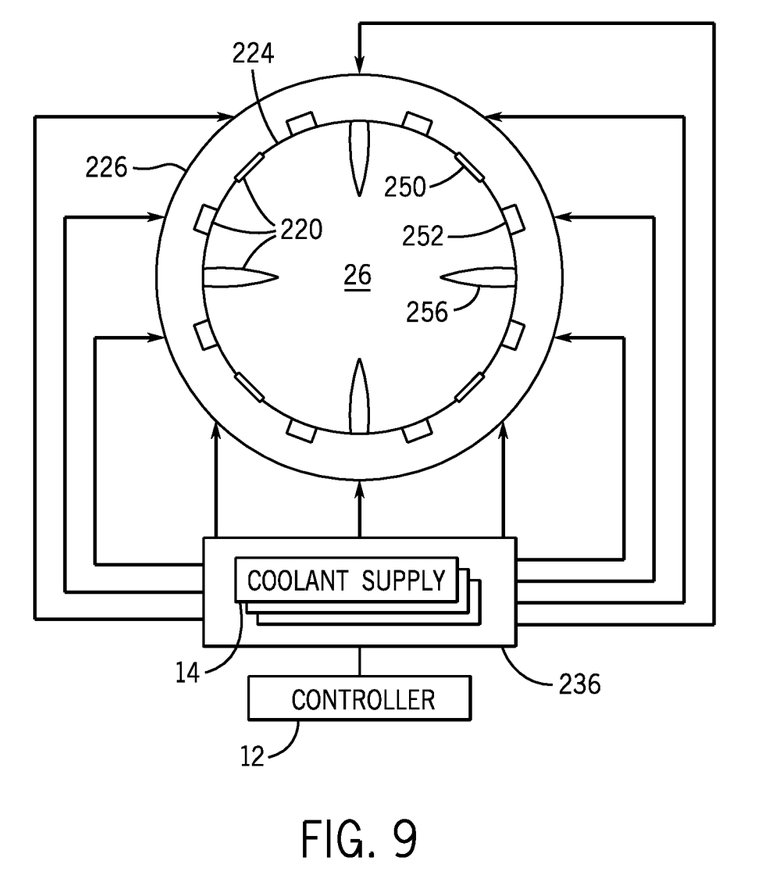
FIG. 9 is an axial cross-sectional view of an exhaust conduit including a plurality of injection sites configured to receive a coolant supply, in accordance with an embodiment of the present disclosure.

FIG. 9 is an axial cross-sectional view of the exhaust conduit 26 including the plurality of injection sites 220 configured to receive the coolant supply 14. As illustrated, the injection sites 220 may be located about different circumferential positions of the exhaust conduit 26. Further, the injection sites 220 may include the same or different configuration. For example, the exhaust conduit 26 may include one or more injection sites 250 that are flush with the outer wall 224, one or more injection sites 252 that are recessed into the outer wall 224, and/or one or more injection sites 256 that protrude into the exhaust conduit 26. In some embodiments, one or more of the injection sites may include turning vanes (e.g., 256) to facilitate mixing of the coolant with the exhaust gas 22.

As set forth above, the controller 12 may control the coolant supply 14 to control the temperature of the exhaust gas 22, the temperature of the steam 24, or both. In some embodiments, the controller 12 may control the coolant supply 14 based on feedback, such as the engine sensor feedback 36, the exhaust sensor feedback 38, the steam turbine sensor feedback 40, the HRSG sensor feedback 42, and/or the coolant supply sensor feedback 44. In certain embodiments, the controller 12 may control the coolant supply 14 using the model-based control 46, the feedback and/or one or more temperature thresholds.

Technical effects of the disclosed subject matter may include balancing the operating constraints of a system (e.g., a combined cycle system) during varying load conditions. Specifically, the disclosed embodiments illustrate the controller 12 that may independently manage the inlet temperature of the HSRG 18, the temperature of the steam 24, and the operation of the engine 16 during varying load conditions, while maximizing the turndown capability of the system 10 (or the system 80). In other words, the controller 12 may enable operation of both the HSRG 18 and the engine 16 at a load condition (e.g., during startup or turndown) that would otherwise (e.g., without the disclosed embodiments) result in a temperature of the exhaust gas 22 that exceeds the boundary conditions or operating constraints of the HSRG 18, while controlling the coolant supply 14 to reduce the temperature of the exhaust gas 22 to remain complaint with the boundary conditions or operating constraints (e.g., thresholds). Similarly, the controller 12 may enable operation of the HSRG 18, the steam turbine 20, and the engine 16 at a load condition (e.g., during startup or turndown) that would otherwise (e.g., without the disclosed embodiments) result in a temperature of the steam 24 that exceeds the boundary conditions or operating constraints of the steam turbine 20, while controlling the coolant supply 14 to reduce the temperature of the steam 24 to remain complaint with the boundary conditions or operating constraints (e.g., thresholds). Thus, the controller 12 may enable the system 10 to flexibly load the engine 16 while operating the HRSG 18 and the steam turbine 20 to increase combined loading (e.g., electrical output) of the engine 16 and the steam turbine 20, which may increase the efficiency of the system 10, saving time and money.

This written description uses examples to disclose the subject matter, including the best mode, and also to enable any person skilled in the art to practice the disclosed subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an exhaust conduit configured to route an exhaust gas from an engine to a heat recovery steam generator (HRSG);
a coolant supply coupled to the exhaust conduit, wherein the coolant supply is configured to supply a coolant to the exhaust conduit at a cooling region; and
a controller configured to:
estimate a temperature of a steam or the exhaust gas downstream of the cooling region based on values of one or more operating parameters upstream of the cooling region, wherein the one or more operating parameters comprise each of an exhaust temperature of the exhausts gas, an exhaust flow rate of the exhaust gas, a coolant temperature of the coolant, and a coolant flow rate of the coolant;
compare the temperature against one or more temperature thresholds to determine if the temperature violates the one or more temperature thresholds; and
adjust the coolant temperature or the coolant flow rate of the coolant supply to the exhaust conduit at the cooling region to control the temperature of the exhaust gas or the steam downstream of the cooling region if the temperature violates the one or more temperature thresholds, wherein the controller is configured to control the coolant supply differently in a full load condition relative to a part load condition of the system.

2. The system of claim 1, comprising the HRSG coupled to the exhaust conduit, a steam turbine coupled to the HRSG, or a combination thereof.

3. The system of claim 1, comprising the engine coupled to the exhaust conduit.

4. The system of claim 1, wherein the controller is configured to receive the one or more operating parameters and to implement a model-based control using the one or more operating parameters to estimate the temperature of the steam or the exhaust gas downstream of the cooling region.

5. The system of claim 1, wherein the cooling region comprises one or more injection ports configured to inject the coolant from the coolant supply into the exhaust gas to mix with the exhaust gas.

6. The system of claim 1, wherein the one or more operating parameters comprise at least one of a pressure of the exhaust gas flowing through the exhaust conduit upstream of the coolant, a pressure of the coolant, a load condition of the system, a load condition of the engine, or a combination thereof.

7. The system of claim 1, wherein the coolant supply comprises a compressor.

8. The system of claim 7, comprising a gas turbine engine having the compressor, a combustor, and a turbine, wherein the coolant supply comprises an extraction conduit coupled to an outlet of the compressor and the exhaust conduit.

9. The system of claim 1, wherein the controller is configured to adjust the coolant temperature or the coolant flow rate of the coolant supply to control the temperature of the exhaust gas downstream of the cooling region if the temperature violates the one or more temperature thresholds.

10. The system of claim 1, wherein the controller is configured to adjust the coolant temperature or the coolant flow rate of the coolant supply to control the temperature of the steam generated by the HRSG downstream of the cooling region if the temperature violates the one or more temperature thresholds.

11. The system of claim 1, wherein the one or more temperature thresholds comprise an upper temperature threshold, a lower temperature threshold, or both.

12. The system of claim 1, wherein the controller is configured to control the coolant supply to decrease the temperature of the steam or the exhaust gas downstream of the cooling region for the part load condition relative to the full load condition of the system.

13. The system of claim 1, wherein the controller is configured to control the coolant supply to increase the coolant flow rate of the coolant, or decrease the coolant temperature of the coolant, or a combination thereof, for the part load condition relative to the full load condition of the system.

14. The system of claim 1, wherein the controller is configured to estimate the temperature of the exhaust gas downstream of the cooling region based on the values of the one or more operating parameters upstream of the cooling region.

15. The system of claim 1, wherein the controller is configured to estimate the temperature of the steam generated by the HRSG downstream of the cooling region based on the values of the one or more operating parameters upstream of the cooling region.

16. The system of claim 1, wherein the controller is configured to estimate the temperature of the steam generated by the HRSG and the exhaust gas downstream of the cooling region based on the values of the one or more operating parameters upstream of the cooling region.

17. A system, comprising:
a controller configured to:
estimate a temperature of a steam or exhaust gas downstream of a cooling region based on values of one or more operating parameters upstream of the cooling region, wherein the cooling region is disposed along an exhaust conduit that routes an exhaust gas from an engine to a heat recovery steam generator (HRSG), wherein the cooling region is coupled to a coolant supply configured to supply a coolant to the exhaust conduit, and the one or more operating parameters comprise each of an exhaust temperature of the exhausts gas, an exhaust flow rate of the exhaust gas, a coolant temperature of the coolant, and a coolant flow rate of the coolant;
compare the temperature against one or more temperature thresholds to determine if the temperature violates the one or more temperature thresholds; and
adjust the coolant temperature or the coolant flow rate of the coolant supply to the exhaust conduit at the cooling region to control the temperature of the exhaust gas or the steam downstream of the cooling region if the temperature violates the one or more temperature thresholds, wherein the controller is configured to control the coolant supply differently in a full load condition relative to a part load condition of the system.

18. The system of claim 17, wherein the controller is configured to adjust the coolant temperature or the coolant flow rate of the coolant supply to decrease the exhaust temperature, the steam temperature, or both, for the part load condition relative to the full load condition of the system.

19. A method, comprising:
supplying, via a coolant supply, a coolant to a cooling region of an exhaust conduit that routes an exhaust gas from an engine to a heat recovery steam generator (HRSG);
estimating, via a controller, a temperature of a steam or exhaust gas downstream of the cooling region based on values of one or more operating parameters upstream of the cooling region, wherein the one or more operating parameters comprise each of an exhaust temperature of the exhausts gas, an exhaust flow rate of the exhaust gas, a coolant temperature of the coolant, and a coolant flow rate of the coolant;
comparing, via the controller, the temperature against one or more temperature thresholds to determine if the temperature violates the one or more temperature thresholds; and
adjusting, via the controller, the coolant temperature or the coolant flow rate of the coolant supply to control the temperature of the exhaust gas or the steam downstream of the cooling region if the temperature violates the one or more temperature thresholds, wherein controlling comprises controlling the coolant supply differently in a full load condition relative to a part load condition.

* * * * *